Oct. 18, 1955     W. R. SCHETTLER     2,720,846
ARTICULATED RAIL VEHICLE
Filed Dec. 11, 1951
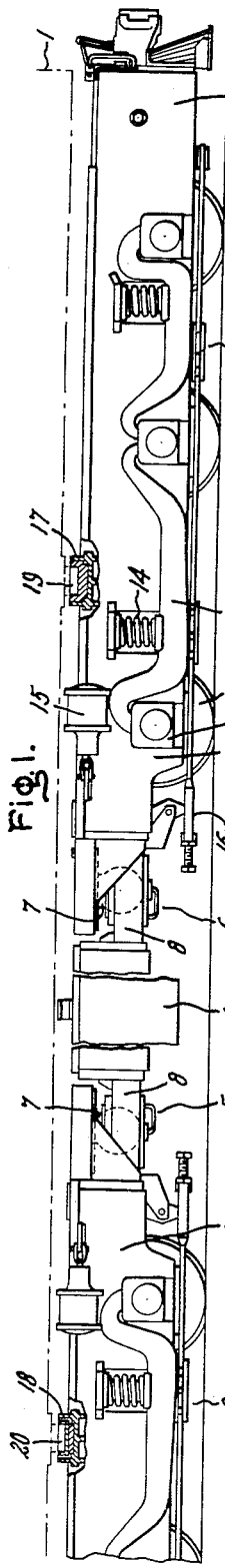
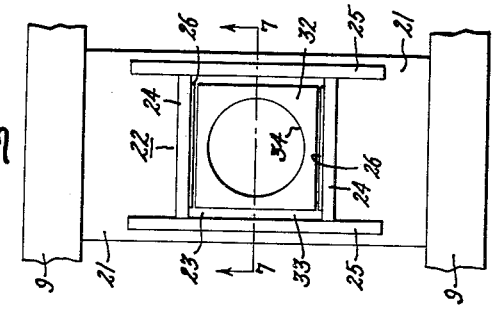
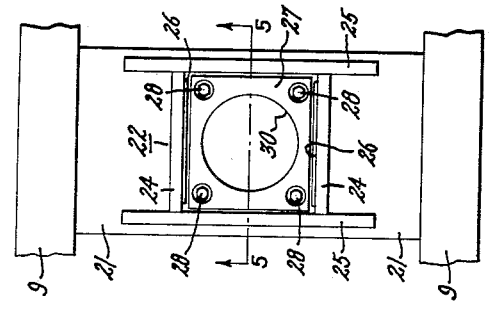
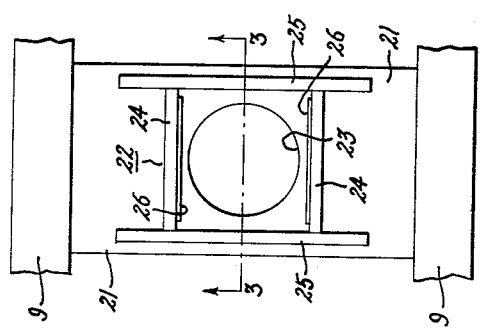
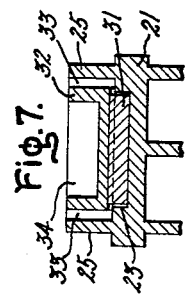
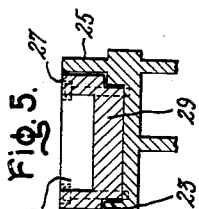
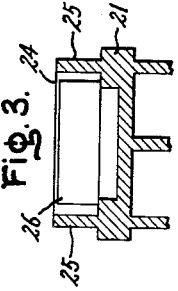
Inventor:
William R. Schettler,
by Ernest H. Britton
His Attorney.

United States Patent Office 2,720,846
Patented Oct. 18, 1955

2,720,846

ARTICULATED RAIL VEHICLE

William R. Schettler, Lawrence Park, Pa., assignor to General Electric Company, a corporation of New York Application December 11, 1951, Serial No. 260,977

8 Claims. (Cl. 105—175)

This invention relates to rail vehicles, such as locomotives, and more particularly to rail vehicles having articulated trucks.

In the design of rail vehicles, such as straight electric or diesel-electric locomotives, it is frequently considered desirable to provide a pair of trucks having an articulated connection. In such constructions, in order that the locomotive may negotiate curves, it is necessary for one of the trucks to have a conventional turning center plate action with respect to the body and for the other truck to have a sliding center plate action, i. e. for the pivot connection between the other truck and the body to slide longitudinally with respect to the truck. This sliding center plate action is necessary since the longitudinal distance between the center plates on the body of the locomotive is fixed. Many locomotives have been built in the past having articulated trucks with one truck having a fixed pivot or center plate action with respect to the body and the other truck having a sliding pivot or center plate action. These trucks, however, by virtue of the different bolster construction to respectively provide for the fixed and sliding pivots, have not in the past been interchangeable. It is desirable, therefore, to provide an articulated truck arrangement utilizing a turning center plate action for one truck and a sliding center plate action for the other truck wherein the two trucks are readily interchangeable.

An object of this invention is, therefore, to provide an articulated truck arrangement having a turning center plate action for one truck and a sliding center plate action for the other truck wherein the trucks are readily interchangeable.

Further objects and advantages of this invention will become apparent and the invention will be more readily understood by reference to the following description and the accompanying drawing and the features of novelty which characterize this invention will be pointed out with particularity in the claims annexed to and forming a part of this application.

This invention in its broadest aspects contemplates a pair of rail vehicle trucks interconnected by an articulated connection with both trucks respectively having identical center plate receiving means formed thereon. An adapting member is removably secured to the center plate receiving means of one of the trucks and is pivotally connected to one of the center plates on the vehicle body. A second adapting member is arranged for limited longitudinal sliding movement in the center plate receiving means of the other truck and is also provided with a pivotal connection with the other center plate on the body. In this way, the first truck is provided with turning center plate action while the second truck has sliding center plate action to enable the vehicle to negotiate curves. Since the center plate receiving means of both trucks are identical, the trucks are readily interchangeable with only the adapting member being different for the turning and sliding center plate applications.

In the drawing, Fig. 1 is a fragmentary side elevational view of the articulated truck arrangement of this invention; Fig. 2 is a fragmentary top view of the bolster construction of both trucks; Fig. 3 is a cross sectional view taken along the line 3—3 of Fig. 2; Fig. 4 is a fragmentary top view of a truck bolster having the adapter for turning center plate action secured thereto; Fig. 5 is a cross sectional view taken along the line 5—5 of Fig. 4; Fig. 6 is a fragmentary top view of the truck bolster having the sliding center plate adapter arranged thereon; and Fig. 7 is a cross sectional view taken along the line 7—7 of Fig. 6.

Referring now to Figs. 1 and 2, there is shown a locomotive having a body 1 and a pair of trucks 2 and 3. In a truck construction actually built in accordance with this invention, a two axle truck 4 was interposed between the three axle trucks 2 and 3 and connected thereto by articulated joints 5 and 6 having ball portions 7 and socket portions 8. The intermediate track 4, forming no part of this invention, is not fully shown and it will be readily understood that the trucks 2 and 3 may be directly connected by a single articulated joint of any suitable type, such as a draw bar.

Each of the trucks 2 and 3 comprises side frames 9 from which yoke portions 10 depend for guiding journal boxes 11. The journal boxes 11 in turn rotatably support the axles on which the wheels 12 are mounted and are interconnected by outside equalizers 13. The equalizers 13 are sprung with suitable compression springs 14 and brake cylinders 15 apply the brakes to the wheels 12 through suitable brake rigging 16. It will be readily understood that the suspension and brake rigging portions of this disclosure are not a part of this invention and that any suitable arrangement may be used.

In order to provide for the negotiation of curves, it is readily apparent that because of the articulated connection between the trucks 2 and 3, one of the trucks must be provided with a pivot that not only permits turning of the truck with respect to the body but also longitudinal sliding with respect to the center plate since the longitudinal distance between the body center plates remains fixed. Accordingly, the truck 3 is connected to the body 1 by means of a fixed pivot or center plate assembly 17 while the other truck 2 is connected to the body 1 by means of a sliding pivot or center plate assembly 18. The center plate assemblies 17 and 18 comprise longitudinally spaced apart downwardly extending center plate members 19 and 20 secured to the under side of the body 1 and the arrangement now to be described.

In order to provide for interchangeability of the trucks 2 and 3, the side frames 9 of each truck are interconnected by a bolster portion 21 having a center plate receiving means 22 formed on the upper surface thereof, the center plate receiving means being identical for each truck. The center plate receiving means 22 of the trucks 2 and 3 respectively comprise a recess 23 formed in the bolster member 21, longitudinally extending and transversely spaced-apart guide members 24 arranged on either side of the recess 23, and transversely extending and longitudinally spaced apart members 25. Wear pads 26 are formed on the adjacent surfaces of the guiding members 24. In order to adapt the arrangement thus far described for use on the truck which is to have the fixed pivot or center plate action, the arrangement shown in Figs. 4 and 5 is provided. Here, an adapter member 27 is provided positioned between the guiding members 24 and removably and fixedly secured to the bolster 21 by means of bolts 28. The adapter member 27 has a portion 29 seated on the recess 23 in the bolster 21 and has a circular cavity 30 formed in its upper surface in which the center plate member 19 is pivotally positioned. It will now be readily seen that the truck 3, when the adapter member 27 is secured thereto, will now have a fixed pivot connection with the body 1.

In order to provide for the sliding pivot or center plate action for the truck 2, the arrangement shown in Figs. 6 and 7 is provided. Referring now to Figs. 6 and 7 in which like elements are indicated by like reference numbers, a spacer member 31 is arranged in the recess 23 in the bolster 21 and adapter member 32 is arranged between the guiding members 24 in sliding engagement with the wear pads 26 and slidingly bearing on the spacer member 31. The adapter member 32, in its center position, is spaced from the transverse members 25, as at 33 thus permitting limited longitudinal movement with respect to the bolster 21. A cavity 34 is formed in the upper surface of the adapter member 32 in which the center plate member 20 is pivotally arranged. It will now be readily seen that the truck 2, by virtue of the provision of the adapter member 32 and the center plate receiving member 22 of truck 2, can pivot with respect to the body and that the truck may also move longitudinally with respect to the body to permit negotiation of curves.

It will now be readily seen that this invention provides an improved articulated construction wherein the trucks are readily interchangeable, both trucks 2 and 3 having identical center plate receiving members 22 and it being merely necessary to provide separate adapter members 27 and 32 to adapt a truck for either turning center plate action or sliding center plate action.

While I have illustrated and described a specific embodiment of this invention, further modifications and improvements will occur to those skilled in the art. I desire it to be understood, therefore, that this invention is not limited to the form shown and I intend in the appended claims to cover all modifications which do not depart from the spirit and scope of this invention.

What I claim as new and desire to secure by Letters Patent of the United States is:

1. In a rail vehicle having a body, a pair of longitudinally spaced-apart trucks for supporting said body and having an articulated connection, said body having a pair of longitudinally spaced-apart centerplates for pivotally connecting said trucks thereto, said trucks respectively having identical centerplate receiving means formed thereon, first adapting means removably secured against longitudinal movement therewith to the centerplate receiving means of one of said trucks and pivotally connected to one of said centerplates whereby turning centerplate action only is provided for said one truck, and a second adapting means arranged for limited longitudinal movement in the centerplate receiving means of the other of said trucks and pivotally connected to the other of said centerplates whereby sliding centerplate action is provided for said other truck to enable said vehicle to negotiate curves.

2. In a rail vehicle having a body, a pair of longitudinally spaced-apart trucks for supporting said body and having an articulated connection, said body having a pair of longitudinally spaced-apart centerplates for pivotally connecting said trucks thereto, each of said trucks comprising a pair of side frames connected by a transverse bolster, said bolsters respectively having identical center plate receiving means formed thereon, first adapting means removably secured against longitudinal movement therewith to the centerplate receiving means of one of said bolsters and pivotally connected to one of said centerplates whereby turning centerplate action only is provided for the truck of said one bolster, and a second adapting means arranged for limited longitudinal movement in the centerplate receiving means of the other of said bolsters and pivotally connected to the other of said centerplates whereby sliding centerplate action is provided for the truck of said other bolster to enable said vehicle to negotiate curves.

3. In a rail vehicle having a body, a pair of longitudinally spaced-apart trucks for supporting said body and having an articulated connection, said body having a pair of longitudinally spaced-apart centerplates for pivotally connecting said trucks thereto, identical centerplate receiving means formed on each of said trucks, each comprising longitudinally extending guiding means, a first adapter member removably and fixedly secured to the centerplate receiving means of one of said trucks and pivotally connected to one of said centerplates whereby turning centerplate action only is provided for said one truck, and a second adapter member slidingly engaging said guiding means of the other of said trucks whereby said second adapter member has limited longitudinal movement with respect to said other truck, said second adapter member being pivotally connected to the other of said centerplates whereby sliding centerplate action is provided for said other truck to enable said vehicle to negotiate curves.

4. In a rail vehicle having a body, a pair of longitudinally spaced-apart trucks for supporting said body and having an articulated connection, said body having a pair of longitudinally spaced-apart centerplates projecting downwardly for pivotally connecting said trucks thereto, each of said trucks comprising a pair of side frames connected by a transverse bolster, identical centerplate receiving means each comprising longitudinally extending guiding means formed on said bolsters, a first adapter member removably and fixedly secured to the centerplate receiving means of one of said bolsters, said first adapter member having a cavity formed in its upper surface with one of said centerplates being pivotally seated therein whereby turning centerplate action only is provided for a truck of said one bolster, and a second adapter member slidingly engaging said guiding means of the other of said bolsters whereby said second adapter member has limited longitudinal movement with respect to said other bolster, said second adapter member having a cavity formed in its upper surface with the other of said centerplates being pivotally seated therein whereby sliding centerplate action is provided for the truck of said other bolster to enable said vehicle to negotiate curves.

5. In a rail vehicle having a body, a pair of longitudinally spaced-apart trucks for supporting said body and having an articulated connection, said body having a pair of longitudinally spaced-apart centerplates for pivotally connecting said trucks thereto, each of said trucks comprising a pair of side frames connected by a transverse bolster, identical centerplate receiving means formed on said bolsters each comprising a pair of longitudinally extending transversely spaced-apart guide members formed on the upper surface of said bolsters, a first adapter member removably and fixedly secured to the centerplate receiving means of one of said bolsters intermediate said guide members, said first adapter member being pivotally connected to one of said centerplates whereby turning centerplate action only is provided for the truck of said one bolster, and a second adapter member positioned intermediate the guiding members of the other of said bolsters whereby said second adapter member has limited longitudinal movement with respect to said other bolster, said second adapter member being pivotally connected to the other of said centerplates whereby sliding centerplate action is provided for the truck of said other bolster to enable said vehicle to negotiate curves.

6. In a rail vehicle having a body, a pair of longitudinally spaced-apart trucks for supporting said body and having an articulated connection, said body having a pair of longitudinally spaced-apart centerplates projecting downwardly for pivotally connecting said trucks thereto, each of said trucks comprising a pair of side frames connected by a transverse bolster, identical centerplate receiving means formed on said bolsters each comprising a pair of longitudinally extending transversely spaced-apart guide members formed on the upper surface of said bolster, a first adapter member removably and fixedly secured to the centerplate receiving means of one of said bolsters intermediate said guide members, said first adapter member having a cavity formed in its upper surface with one of said centerplates being pivotally seated therein whereby turning centerplate action only is provided for a truck of said one bolster, and a second adapter member positioned intermediate the guiding members of the other of said bolsters whereby said second adapter member has limited longitudinal movement with respect to said other bolster, said second adapter member having a cavity formed in its upper surface with the other of said centerplates being pivotally seated therein whereby sliding centerplate action is provided for the truck of said other bolster to enable said vehicle to negotiate curves.

7. In a rail vehicle having a body, a pair of longitudinally spaced-apart trucks for supporting said body and having an articulated connection, said body having a pair of longitudinally spaced-apart centerplates for pivotally connecting said trucks thereto, each of said trucks comprising a pair of side frames connected by a transverse bolster, said bolsters respectively having identical centerplate receiving means formed thereon each comprising a recess formed in the upper surface of said bolster and a pair of longitudinally extending transversely spaced-apart guide members formed on the upper surface of said bolster on either side of said recess, a first adapter member removably secured to the centerplate receiving means of one of said bolsters intermediate said guide members and having a portion seated in said recess, said first adapter member being pivotally connected to one of said centerplates whereby turning centerplate action is provided for the truck of said one bolster, a spacer member positioned in the recess of the centerplate receiving means of the other of said bolsters, and a second adapter member positioned intermediate the guiding members of the other of said bolsters and slidingly bearing on the upper surface of said spacer member whereby said second adapter member has limited longitudinal movement with respect to said other bolster, said second adapter member being pivotally connected to the other of said center plates whereby sliding centerplate action is provided for the truck of said other bolster to enable said vehicle to negotiate curves.

8. In a rail vehicle having a body, a pair of longitudinally spaced-apart trucks for supporting said body and having an articulated connection, said body having a pair of longitudinally spaced-apart center plates projecting downwardly for pivotally connecting said trucks thereto, each of said trucks comprising a pair of side frames connected by a transverse bolster, said bolsters respectively having identical centerplate receiving means formed thereon each comprising a recess formed in the upper surface of said bolster and a pair of longitudinally extending transversely spaced-apart guide members formed on the upper surface of said bolster on either side of said recess, a first adapter member removably secured to the centerplate receiving means of one of said bolsters intermediate said guide members and having a portion seated in said recess, said first adapter member having a cavity formed in its upper surface with one of said centerplates being pivotally seated therein whereby turning centerplate action is provided for the truck of said one bolster, a spacer member positioned in the recess of the centerplate receiving means of the other of said bolsters, and a second adapter member positioned intermediate the guiding members of the other of said bolsters and slidingly bearing on the outer surface of said spacer member whereby said second adapter member has limited longitudinal movement with respect to said other bolster, said second adapter member having a cavity formed in its upper surface with the other of said centerplates being pivotally seated therein whereby sliding centerplate action is provided for the truck of the said other bolster to enable said vehicle to negotiate curves.

References Cited in the file of this patent

UNITED STATES PATENTS

| Number | Name | Date |
|---|---|---|
| 927,386 | Vaucelain | July 6, 1909 |
| 2,138,139 | Burkhardt | Nov. 29, 1938 |
| 2,151,603 | Kjolseth | Mar. 21, 1939 |

FOREIGN PATENTS

| 98,371 | Canada | May 30, 1950 |
| | (Abstract) | |